United States Patent
Velde (10) Patent No.: US 12,084,330 B2
(45) Date of Patent: Sep. 10, 2024

(54) WORK VEHICLE FORK ALIGNMENT SYSTEM AND METHOD

(71) Applicant: Deere & Company, Moline, IL (US)

(72) Inventor: Todd F. Velde, Dubuque, IA (US)

(73) Assignee: Deere & Company, Moline, IL (US)

( * ) Notice: Subject to any disclaimer, the term of this patent is extended or adjusted under 35 U.S.C. 154(b) by 475 days.

(21) Appl. No.: 17/446,222

(22) Filed: Aug. 27, 2021

(65) Prior Publication Data

US 2023/0068920 A1   Mar. 2, 2023

(51) Int. Cl.

| | |
|---|---|
| *B66F 9/24* | (2006.01) |
| *B66F 9/075* | (2006.01) |
| *G05B 13/02* | (2006.01) |
| *G06F 18/21* | (2023.01) |
| *G06V 20/20* | (2022.01) |
| *G06V 20/56* | (2022.01) |
| *H04N 13/204* | (2018.01) |

(52) U.S. Cl.
CPC .............. *B66F 9/24* (2013.01); *B66F 9/0755* (2013.01); *G05B 13/027* (2013.01); *G06F 18/21* (2023.01); *G06V 20/20* (2022.01); *G06V 20/56* (2022.01); *H04N 13/204* (2018.05)

(58) Field of Classification Search
CPC ........ B66F 9/24; B66F 9/0755; G05B 13/027; G06F 18/21; G06V 20/56; H04N 13/204
USPC .......................................................... 701/50
See application file for complete search history.

(56) References Cited

U.S. PATENT DOCUMENTS

| | | | |
|---|---|---|---|
| 7,287,625 B1 | 10/2007 | Harris | |
| 10,407,879 B2 | 9/2019 | Gonzalez et al. | |
| 10,981,763 B2 | 4/2021 | Myers et al. | |
| 2003/0234721 A1 | 12/2003 | Figueira | |
| 2009/0114485 A1 | 5/2009 | Eggert | |
| 2020/0339347 A1* | 10/2020 | Williams | ................ B65F 3/043 |
| 2020/0377351 A1* | 12/2020 | Uchimura | ............. B66F 9/0755 |
| 2021/0078843 A1* | 3/2021 | Hattori | ...................... G06T 7/70 |

(Continued)

FOREIGN PATENT DOCUMENTS

EP       2769361 B1       9/2018

OTHER PUBLICATIONS

Velde et al., Ground Engaging Tool Contact Detection System and Method, Unpublished Application, U.S. Appl. No. 17/444,213, filed Aug. 2, 2021, 17 pages (specification and drawings).

(Continued)

*Primary Examiner* — Krishnan Ramesh (57) ABSTRACT

A work vehicle comprising a pair of forks and an optical sensor. The optical sensor is configured to capture image data that includes the pair of forks and a moveable object. An electronic processor is configured to perform an operation by controllably adjusting the pair of forks, receive image data captured by the optical sensor, apply an artificial neural network to identify whether the pair of forks are aligned for moving the moveable object based on the image data, wherein the artificial neural network is trained to receive the image data as input and to produce as the output an indication of whether the pair of forks are aligned for moving the moveable object, access operation information corresponding to whether the pair of forks are aligned for moving the moveable object from a non-transitory computer-readable memory, and automatically adjust an operation of the work vehicle based on the operation information.

16 Claims, 5 Drawing Sheets

(56) References Cited

U.S. PATENT DOCUMENTS

| | | | |
|---|---|---|---|
| 2021/0087031 A1* | 3/2021 | Lunscher | G05D 1/0238 |
| 2021/0087033 A1* | 3/2021 | Kimura | B66F 9/24 |
| 2021/0216073 A1* | 7/2021 | Araki | G05D 1/0094 |
| 2021/0246004 A1* | 8/2021 | Kamiya | H04Q 9/00 |
| 2022/0089420 A1* | 3/2022 | Faimali | B66F 9/143 |
| 2022/0375206 A1* | 11/2022 | Onoda | B66F 9/0755 |
| 2024/0005548 A1* | 1/2024 | Kai | G06T 7/70 |

OTHER PUBLICATIONS

Kennedy et al., Image-Based Attachment Identification and Position Detection, Unpublished Application, U.S. Appl. No. 16/891,416, filed Jun. 3, 2020, 23 pages (specification and drawings).

* cited by examiner

WORK VEHICLE FORK ALIGNMENT SYSTEM AND METHOD

FIELD OF THE DISCLOSURE

The present disclosure relates generally to work vehicle ground engaging tool alignment systems and methods, and more particularly to a fork alignment system and method for a wheel loader or skid steer.

BACKGROUND OF THE DISCLOSURE

Work vehicles equipped with a ground engaging tool, such as a wheel loader or skid steer having forks, can be used in construction and maintenance for moving objects. When moving pallets with forks for instance, a wheel loader can be used to move rather large or heavy items. When controlling a ground engaging tool, such as a pair of forks, it is valuable to know when the tool is in aligned with the object to be moved. As such, there is a need in the art for an improved system and method that identifies when the ground engaging tool is aligned with the object to be moved.

SUMMARY OF THE DISCLOSURE

According to one embodiment of the present disclosure, a method of operating a work vehicle is disclosed. The method includes capturing image data with an optical sensor coupled to the work vehicle wherein, the image data includes a pair of forks and a moveable object. The method further includes identifying whether the pair of forks are aligned for moving the moveable object by processing the image data with an electronic processor. The method includes accessing, from a non-transitory computer-readable memory, operation information corresponding to whether the pair of forks are aligned for moving the moveable object. The method further includes adjusting an operation of the work vehicle based on the accessed operation information corresponding to whether the pair of forks are aligned for moving the moveable object.

According to another embodiment of the present disclosure, a control system for a work vehicle is disclosed. The control system comprises an optical sensor coupled to the work vehicle. The optical sensor is configured to capture image data that includes a pair of forks and a moveable object. A non-transitory computer-readable memory storing operation information is provided. An electronic processor is configured to perform an operation by controllably adjusting a position of the pair of forks, receiving image data captured by the optical sensor, applying an artificial neural network to identify whether the pair of forks are aligned for moving the moveable object based on the image data from the optical sensor, wherein the artificial neural network is trained to receive the image data as input and to produce as the output an indication of whether the pair of forks are aligned for moving the moveable object, accessing, from the non-transitory computer-readable memory, the operation information corresponding to whether the pair of forks are aligned for moving the moveable object, and adjusting an operation of the work vehicle based on the accessed operation information corresponding to whether the pair of forks are aligned for moving the moveable object.

According to another embodiment of the present disclosure a work vehicle is disclosed. The work vehicle comprises a pair of forks and an optical sensor coupled to the work vehicle. The optical sensor is configured to capture image data that includes the pair of forks and a moveable object. The work vehicle further comprises a non-transitory computer-readable memory storing operation information and an electronic processor configured to perform an operation by controllably adjusting a position of the pair of forks, receive image data captured by the optical sensor, apply an artificial neural network to identify whether the pair of forks are aligned for moving the moveable object, wherein the artificial neural network is trained to receive the image data as input and to produce as the output an indication of whether the pair of forks are aligned for moving the moveable object, access, from the non-transitory computer-readable memory, the operation information corresponding to whether the pair of forks are aligned for moving the moveable object, and automatically adjust an operation of the work vehicle based on the accessed operation information corresponding to whether the pair of forks are aligned for moving the moveable object.

Other features and aspects will become apparent by consideration of the detailed description and accompanying drawings.

BRIEF DESCRIPTION OF THE DRAWINGS

The detailed description of the drawings refers to the accompanying figures in which.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION OF THE DRAWINGS

Figure 1:
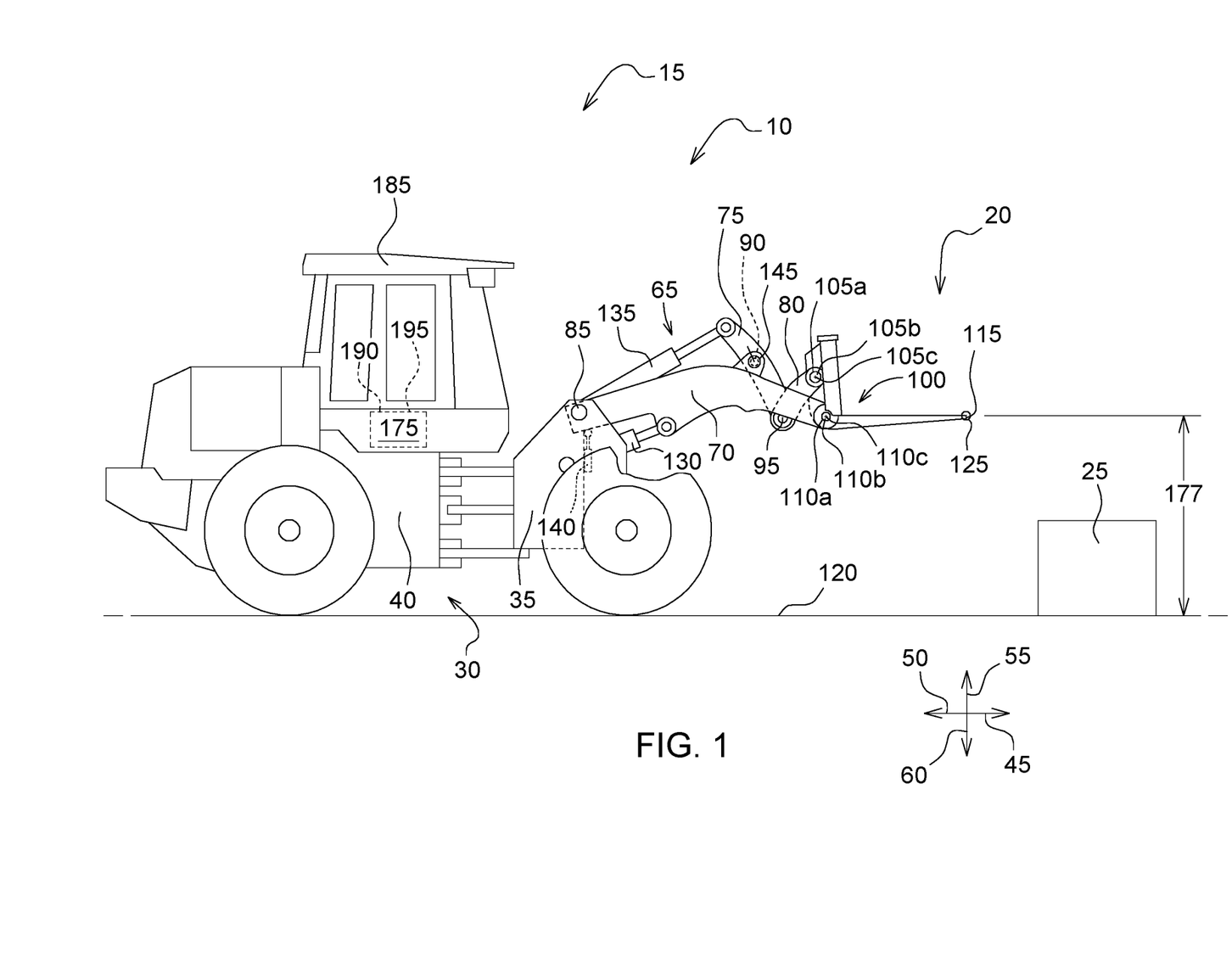
FIG. 1 is a right-side view of a work vehicle with a ground engaging tool in a level position according to an embodiment.

FIG. 1 depicts a work vehicle 10, which is illustrated as a wheel loader 15 but which could be any of number of other work vehicles 10 where it is desirable to align an attached ground engaging tool 20 with a moveable object 25, such as backhoes, compact track loaders, crawler loaders, skid steers, and tractors. The work vehicle 10 comprises a chassis 30 to support the work vehicle 10, which in turn comprises a front chassis 35 pivotally connected to a rear chassis 40 so as to enable the work vehicle 10 to be steered by articulation of the chassis 30. In this context, direction 45 may be referred to as forward, direction 50, the opposite of direction 45 may be referred to as rearward, direction 55 may be referred to as upward, and direction 60, the opposite of direction 55 may be referred to as downward, with height measured along the direction 55.

A linkage 65 is connected to the front chassis 35. The linkage 65 comprises multiple rigid members, including a boom 70, a bellcrank 75, and a lower link 80. The rearward portion of the linkage 65 is connected to the front chassis 35 so as to enable the boom 70, which is comprised of two parallel arms, to pivot relative to the front chassis 35 about boom pins 85. The bellcrank 75 is connected to the boom 70 so as to enable the bellcrank 75 to pivot relative to the boom 70 about a bellcrank pin 90. The lower link 80 is connected to the bellcrank 75 so as to enable the lower link 80 to pivot relative to the bellcrank 75 about a lower link pin 95. The forward portion of the linkage 65 is connected to the ground engaging tool 20, in this embodiment a pair of forks 100, such that the forks 100 are able to be moved upward 55 or downward 60 by the linkage 65 or rotated forward 45/downward 60 or rearward 50/upward 55 (i.e., clockwise and counterclockwise in FIG. 1, respectively). The forks 100 are of the type commonly used by vehicles to move and transport moveable objects 25, such as pallets 27 (FIG. 2A) containing goods and materials, by driving forward until the forks 100 are engaged in slots 102 or grooves in the pallet 27, raising the forks 100 to lift the pallet 27 off the surface on which it was resting, and transporting the pallet 27 to another location. The pair of forks 100 may be referred to as forks or a pair of forks.

The forks 100 comprise top bore 105a, base bores 110a, and a tip 115. The top bore 105a receives a top pin 105b which is also received by a bore in the lower link 80 so as to enable the top bore 105a to pivot relative to the lower link 80 about a top axis 105c while still being supported by the lower link 80. The base bores 110a receive base pins 110b which are also received by a bore in each of the two arms of the boom 70 so as to enable the base bores 110a to pivot relative to the boom 70 about a base axis 110c while still being supported by the boom 70. Although a single bore-and-pin combination is used for the top bore 105a and the top pin 105b and a pair of co-axial base bores 110a receive a pair of co-axial base pins 110b in FIG. 1, it is understood that each of the two pivotal connections of the forks 100 to the linkage 65 may utilize any number of co-axial bores and pins, in the same manner that the boom 70 and the bellcrank 75 may be single members or multiple parallel members with co-axial bores and pins.

A tip 115 comprises a forward portion of the forks 100 when the forks 100 are level or positioned parallel to a ground surface 120 supporting the work vehicle 10 as shown in FIG. 1. Being the forward portion of the forks 100, the tip 115 is the first portion of the forks 100 to be inserted into slots 102 (e.g., holes, grooves, gaps) when the work vehicle 10 moves forward 45 to engage a pallet 27 or other moveable object 25. A tip axis 125 is an axis parallel to the base axis 110c but offset such that it passes through the tip 115. When the forks 100 first engage a pallet 27 and the tip 115 is positioned at the entrance to the slots 102, rotation of the forks 100 about the tip axis 125 would not affect the height of the tip 115 in the direction 55 and thus should not cause movement of the tip 115 relative to the slots 102. For example, if the tip 115 is placed at the proper height to engage slots 102 in a pallet 27, rotation of the forks 100 about the tip axis 125 may be used to level the forks 100 without interfering with the alignment of the tip 115 to the pallet 27 slots 102. Leveling the forks 100 helps to fully engage the slots 102 in the pallet 27 or to otherwise fully engage a moveable object 25 to be able to move the moveable object 25.

Figure 2A:
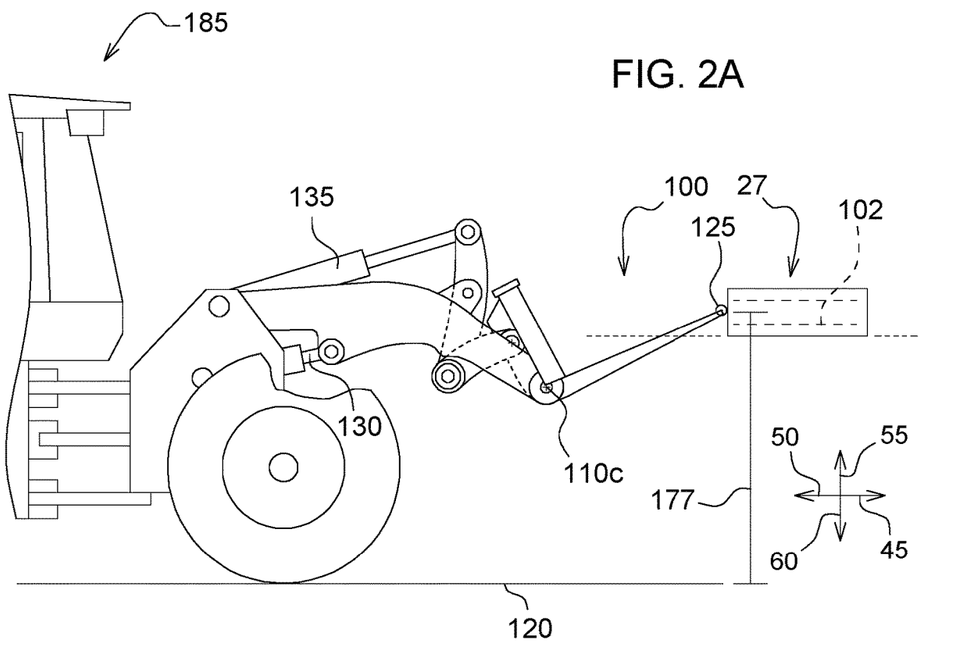
FIG. 2A is a right-side view of a portion of the work vehicle of FIG. 1 with the ground engaging tool in a tilted position.
Figure 2B:
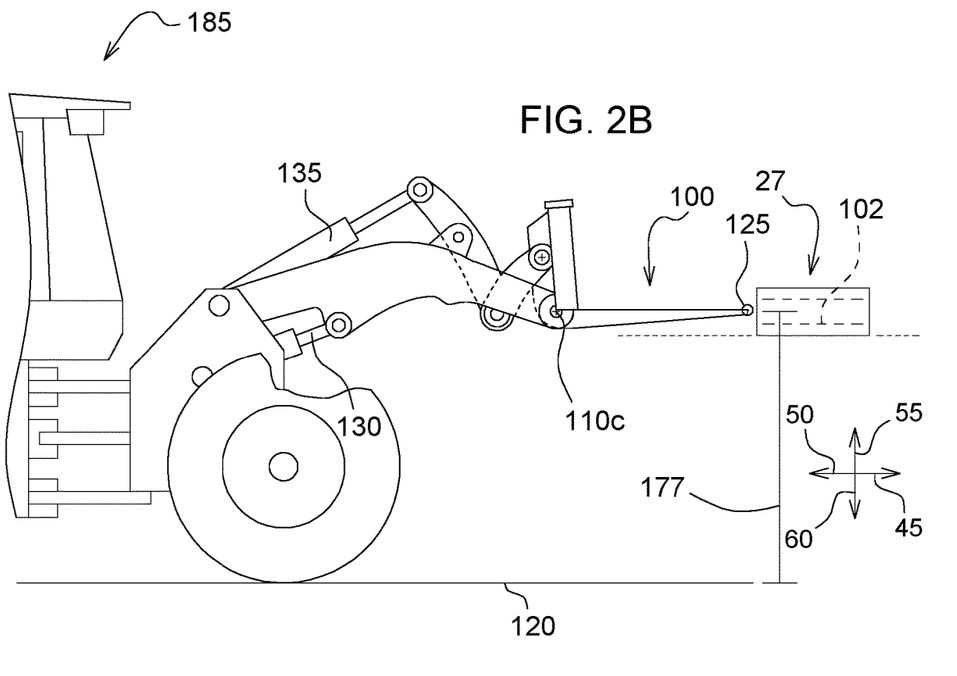
FIG. 2B is a right-side view of a portion of the work vehicle of FIG. 1 with the ground engaging tool in a level position.
Figure 3:
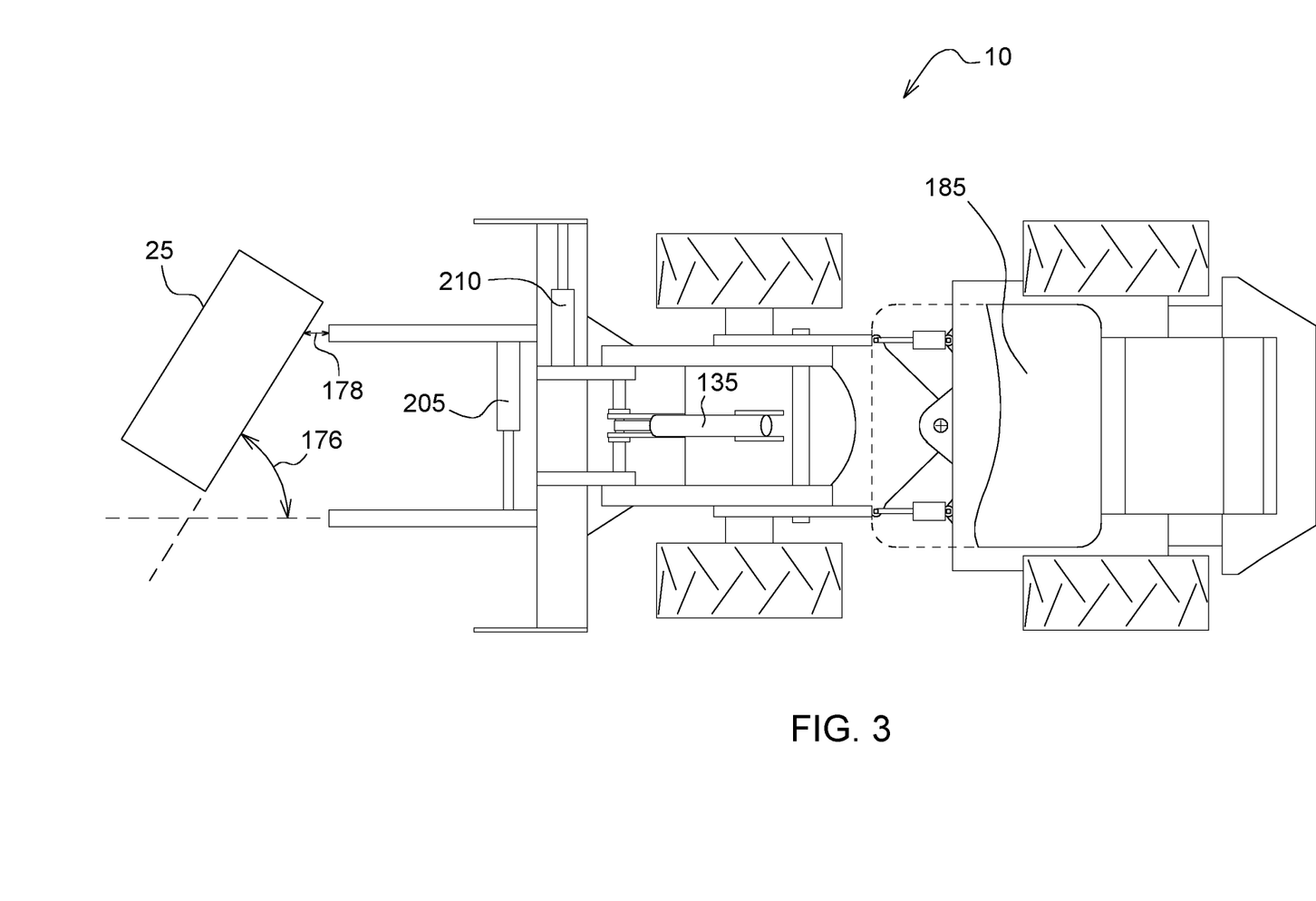
FIG. 3 is a top view of the work vehicle of FIG. 1.

As used to describe the embodiment shown in FIGS. 1-3, "level" refers to the tines, or each fork, of the forks 100 being level relative to the ground surface 120 supporting the work vehicle 10. Determining whether the forks 100 are level could be done in a number of manners, but one manner would be to determine at what angle of the forks 100 relative to the chassis 30 are the forks 100 level relative to the ground surface 120 and use that angle to level the forks 100 while assuming that the angle of the chassis 30 relative to the ground surface 120 is consistent. In alternate embodiments, level may refer to something other than a level angle relative to the chassis 30 and the ground surface 120, for example it may be level relative to a direction of gravity. As one example, should the ground surface 120 be sloping upward 55, then the reference plane for "level" for the forks 100 could be the ground surface 120 or it instead could be a plane perpendicular to the direction of gravity. If the direction of gravity is used, the forks 100 may be level though not parallel to the ground surface 120 if the ground surface 120 is angled upward 55 or downward 60. To determine the direction of gravity in order to use it to form the reference plane, an accelerometer or an IMU (inertial-measurement unit) may be connected to a part of the work vehicle 10, such as the chassis 30, linkage 65, or the forks 100.

The forks 100 are movably connected to the chassis 30, specifically the front chassis 35. This movement is effectuated by three actuators, a pair of lift cylinders 130 and a tilt cylinder 135. The lift cylinders 130 are a pair of hydraulic cylinders or electronic actuators which are pivotally connected by pin and bore arrangements at a rearward end to the front chassis 35 and at a forward end to the boom 70. Actuation of the lift cylinders 130 therefore results in rotation of the boom 70 about the boom pin 85. The tilt cylinder 135 is a hydraulic cylinder or electronic actuator which is pivotally connected by a pin and bore arrangement at a rearward end to the front chassis 35 and at a forward end to the bellcrank 75. Actuation of the tilt cylinder 135 therefore results in rotation of the bellcrank 75 about the bellcrank pin 90, which results in rotation of the forks 100 about the base axis 110c.

Due to the kinematics of the linkage 65, which may be referred to as a Z-bar linkage, the actuation of the lift cylinders 130 may cause both a change in the height of the forks 100 and a change in the tilt of the forks 100 (i.e., the angle of the forks 100 relative to the front chassis 35). In other words, actuation of the lift cylinders 130 may cause both translation of the base pins 110b (and thus the base axis 110c) as well as the rotation of the forks 100 about the base axis 110c relative to the chassis 30. At the tip axis 125, the combined kinematics of the forks 100 and the linkage 65 result in the height of the tip axis 125 being changed by an actuation of the lift cylinders 130 or an actuation of the tilt cylinder 135. In other words, although the lift cylinders 130 and the tilt cylinder 135 are referred to as "lift" and "tilt" cylinders to aid in the description of the work vehicle 10, each cylinder may effectuate both a lifting of the tip 115 of the forks 100 and a tilting of the forks 100 when actuated.

The current kinematics may be determined with knowledge of the geometry and current position of the linkage 65 and the forks 100. The current position of the linkage 65, and thus the forks 100, may be sensed by one or more sensors. For work vehicle 10, this includes a lift sensor 140 and a tilt sensor 145. The lift sensor 140 is positioned with one portion connected to the front chassis 35 and another portion which rolls along the underside of the boom 70 in a cam-follower type of arrangement. The lift sensor 140 is thereby able to provide a signal indicative of a position of the boom 70, specifically the angle of the boom 70 relative to the front chassis 35. The tilt sensor 145 is positioned with one portion connected to the boom 70 and another portion connected to the bellcrank 75. The tilt sensor 145 is thereby able to provide a signal indicative of a position of the bellcrank 75 relative to the boom 70.

Figure 4:
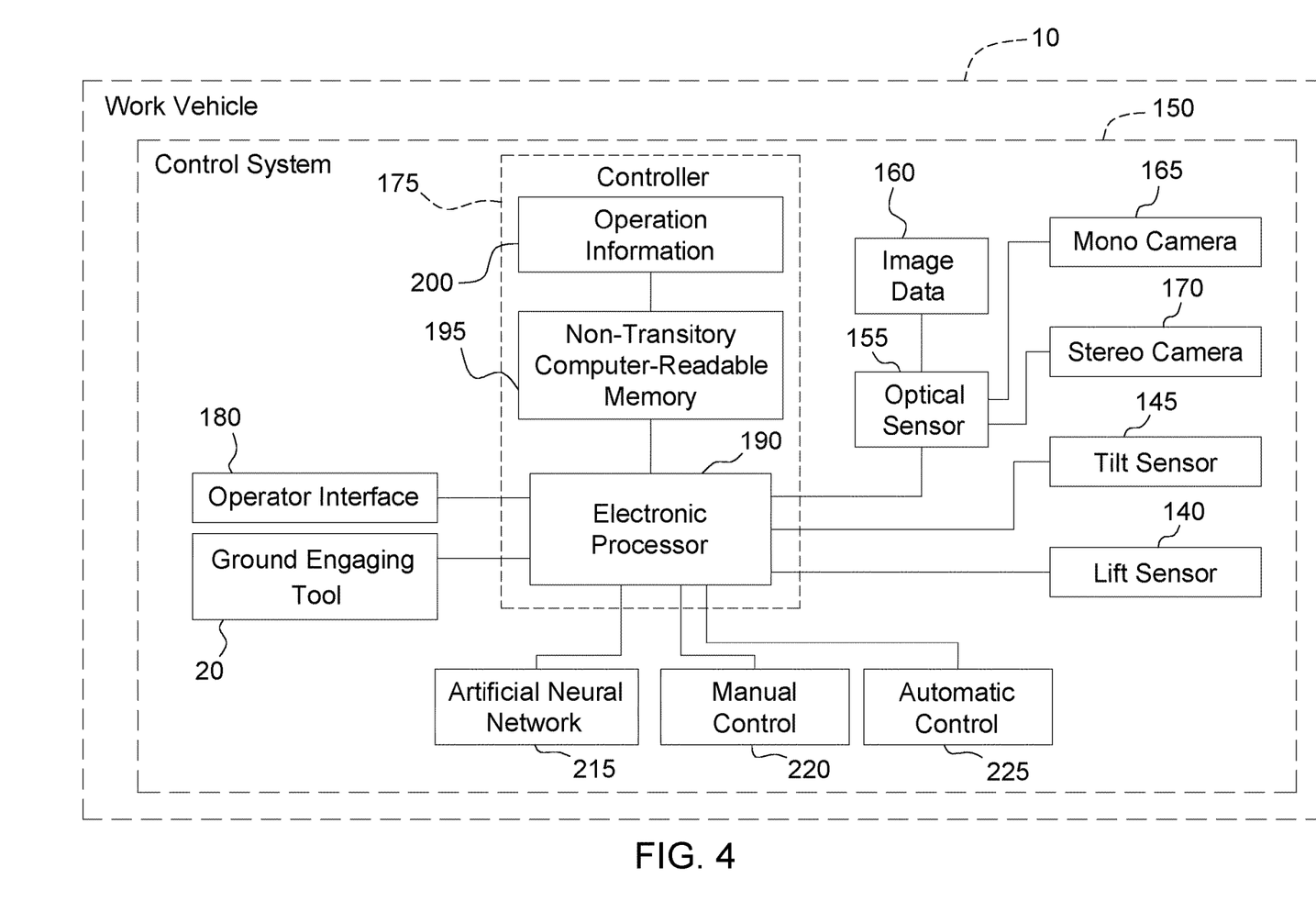
FIG. 4 is a block diagram of a control system according to an embodiment.

With reference to FIG. 4, the work vehicle 10 has a control system 150. The control system 150 may include an optical sensor 155 coupled to the work vehicle 10. The optical sensor 155 may be configured to capture an image or image data 160 that includes the pair of forks 100 and the moveable object 25 in the image. The optical sensor 155 may comprise a mono camera 165 or a stereo camera 170, which may be configured to provide image data 160 to enable a controller 175 to determine an alignment error between the pair of forks 100 and the moveable object 25. The alignment error may include whether or not the pair of forks 100 are level compared to the moveable object 25, the relative angle 176 (FIG. 3) between the pair of forks 100 and the moveable object 25 (FIG. 3), the difference in height 177 between the pair of forks 100 and the moveable object 25 (FIG. 1), and the distance 178 between the pair of forks 100 and the moveable object 25 (FIG. 3). The alignment error may be displayed on an operator interface 180 positioned within an operator's station 185 (FIG. 1) or remote from the work vehicle 10 at a remote processing center (not shown).

Each of the lift sensor 140, the tilt sensor 145, and the optical sensor 155 are in communication with the controller 175, which may comprise an electronic processor 190 and non-transitory computer-readable memory 195. As used herein, "controller" is intended to be used consistent with how the term is used by a person of skill in the art, and refers to a computing component with processing, memory, and communication capabilities which is utilized to control or communicate with one or more other components. In the embodiment illustrated in FIG. 1, the controller 175 is a vehicle control unit (VCU) which controls multiple functions of the work vehicle 10, but in alternate embodiments it could be a standalone controller.

The electronic processor 190 is provided and configured to perform an operation by controllably adjusting a position of the pair of forks 100 relative to the work vehicle 10. The electronic processor 190 may be arranged locally as part of the work vehicle 10 or remotely at the remote processing center. In various embodiments, the electronic processor 190 may comprise a microprocessor, a microcontroller, a central processing unit, a programmable logic array, a programmable logic controller, other suitable programmable circuitry that is adapted to perform data processing and/or system control operations.

With continued reference to FIG. 4, the non-transitory computer-readable memory 195 may store operation information 200. The operation information 200 may include changes or adjustments the work vehicle 10 needs to make to be able to align with and move a moveable object 25. The operation information 200 may include changes or adjustments the work vehicle 10 needs to make for a specific alignment error to eliminate or reduce the alignment error to close to zero. For example, the operation information 200 may include changing a spacing of the pair of forks 100 with a fork spacing actuator 205 positioned between the forks (FIG. 3), side-shifting the pair of forks 100 with a fork side-shifting actuator 210 coupled between the pair of forks 100 and the boom 70 (FIG. 3), raising the pair of forks 100 with the lift cylinders 130 (FIG. 1), lowering the pair of forks 100 with the lift cylinders 130 (FIG. 1), tipping upward the pair of forks 100 with the tilt cylinder 135 (FIG. 2a), tipping downward the pair of forks 100 with the tilt cylinder 135, or moving the work vehicle 10 forward 45, rearward 50, or turning the work vehicle 10. The non-transitory computer-readable memory 195 may comprise electronic memory, nonvolatile random-access memory, an optical storage device, a magnetic storage device, or another device for storing and accessing electronic data on any recordable, rewritable, or readable electronic, optical, or magnetic storage medium.

Referring to FIGS. 1-4, the controller 175 may be configured to receive the signals provided by the lift sensor 140, the tilt sensor 145, and the optical sensor 155, and values for the distances between the pins of the linkage 65 (i.e., the known geometry of the linkage 65), and determine the posture of the linkage 65 including any number of angles or positions. For example, the controller 175 can determine the position of the base axis 110C relative to the front chassis 35 by applying trigonometry to the length from the boom pin 85 to the base pins 110b and the angle provided by the lift sensor 140. In a similar manner, the controller 175 can determine the positions of the top axis 105c and the tip axis 125 (and thus the heights of these) and provide values such as the angle of the forks 100 relative to the ground surface 120, using known distances between pins and the signals from the lift sensor 140 and the tilt sensor 145. By determining the changes in these positions over time, the controller 175 is also able to determine the velocity or acceleration for any of these positions of the linkage 65 and the forks 100. In this way, the lift sensor 140 and the tilt sensor 145 are each providing signals indicative of the position, velocity, and acceleration of the linkage 65 and the forks 100. Specifically, these sensors are each providing signals indicative of the position, velocity, and acceleration of the forks 100, including the tip 115 and the tip axis 125. The controller 175 can determine the position of the pair of forks 100 relative to the moveable object 25 using the alignment error information including angle 176, distance 178, and height 177 from the image data 160 from the optical sensor 155.

The controller 175 may be configured to apply an algorithm of an artificial neural network 215 to identify whether the pair of forks 100 are aligned for moving the moveable object 25. The artificial neural network 215 may be trained to receive the image data 160 as input and to produce as the output an indication of whether the pair of forks 100 are aligned for moving the moveable object 25. The controller 175 may access, from the non-transitory computer-readable memory 195, the operation information 200 corresponding to whether the pair of forks 100 are aligned for moving the moveable object 25, and automatically adjust an operation of the work vehicle 10 based on the accessed operation information 200 corresponding to whether the pair of forks 100 are aligned for moving the moveable object 25. The controller 175 may also take into account the alignment error. The adjusting the operation of the work vehicle 10 may comprise changing a spacing of the pair of forks 100, side-shifting the pair of forks 100, raising the pair of forks 100, lowering the pair of forks 100, tipping upward the pair of forks 100, tipping downward the pair of forks 100, driving the work vehicle 10 forward 45, rearward 50, or turning the work vehicle 10. The adjusting may be done by manual control 220 by an operator using a control lever (not shown) or by automatic control 225 by the controller 175.

FIG. 1 illustrates the placement of sensors in one embodiment, but alternate embodiments may utilize different placements or sensors measuring different types of data. As one example, an IMU may be placed on one of the base pins 110b and provide a signal indicative of three orthogonal linear accelerations and three angular velocities about three orthogonal axes. The controller 175 may receive this IMU signal and determine the position of one of the base pins 110b and, if the base pins 110b rotate with the forks 100, the angle of the forks 100. The accuracy of these calculations may be increased by data from an additional sensor, such as the lift sensor 140, to prevent error accumulation over time. As another example, an IMU may be placed at the tip 115 and directly provide the linear accelerations and angular velocities experienced by the tip 115, enabling the controller 175 to calculate any number of relevant positions, velocities, or accelerations, with an additional absolute angular sensor on one or more portions of the linkage 65 to correct for drift and error accumulation over time.

FIG. 2a shows a portion of the work vehicle 10 with the forks 100 tilted rearward 50/upward 55 (i.e., counterclockwise) relative to the ground surface 120. An operator operating the work vehicle 10 from the operator's station 185 under manual control 220 may actuate the control lever to control the lift cylinders 130 to raise the boom 70 until the tip axis 125 is aligned with slots 102 in a pallet 27, with the tip axis 125 at the height 177.

Alternatively, the operator may select automatic control 225 via the operator interface 180. Upon actuation of automatic control 225, the controller 175 actuates the lift cylinders 130 and the tilt cylinder 135 to level the forks 100. The controller 175 actuates both the lift cylinders 130 and the tilt cylinder 135 by the proper amounts to achieve a net movement by the forks 100 of a rotation about the tip axis 125. This allows the forks 100 to change their angle to level while still ending up with the tip axis 125 at the height 177.

Once the controller 175 actuates the forks 100 to the level position, which is shown in FIG. 2b, the work vehicle 10 can be manually or automatically driven forward to engage the forks 100 in the slots 102 of the pallet 27 as the forks 100 are already at the appropriate height 177. In alternate embodiments, the controller 175 may be triggered to perform this leveling operation and engagement of the moveable object 25 in ways other than a selection on the operator interface 180 or other operator input, such as based on the location of work vehicle 10, its proximity to a pallet 27, or how the operator is operating the linkage 65.

In FIGS. 2A and 2B, the height 177 of the tip axis 125 and tip 115 is shown relative to the ground surface 120 supporting the work vehicle 10, but in practice the height would often be measured relative to a point on the chassis 30 (such as the boom pin 85) or another reference point in a fixed relationship to the chassis 30. In alternate embodiments, a height of the tip 115 may be measured relative to something external to the work vehicle 10.

The controller 175 effectuates its actuation of the lift cylinders 130 and the tilt cylinder 135 by controlling a series of electrohydraulic valves (not shown). The controller 175 provides a voltage signal to the electrohydraulic valves that open and close such valves, thereby controlling the flow of hydraulic fluid from the hydraulic pumps of the work vehicle 10 to the lift cylinders 130 and the tilt cylinder 135. In alternate embodiments, the controller 175 may actuate the cylinders in alternate manners, such as by directly controlling pump displacement to control the flow of fluid, or by actuating one or more components which in turn actuate valves to control the cylinders, such as relays, switches, clutches, or other controllers.

Figure 5:
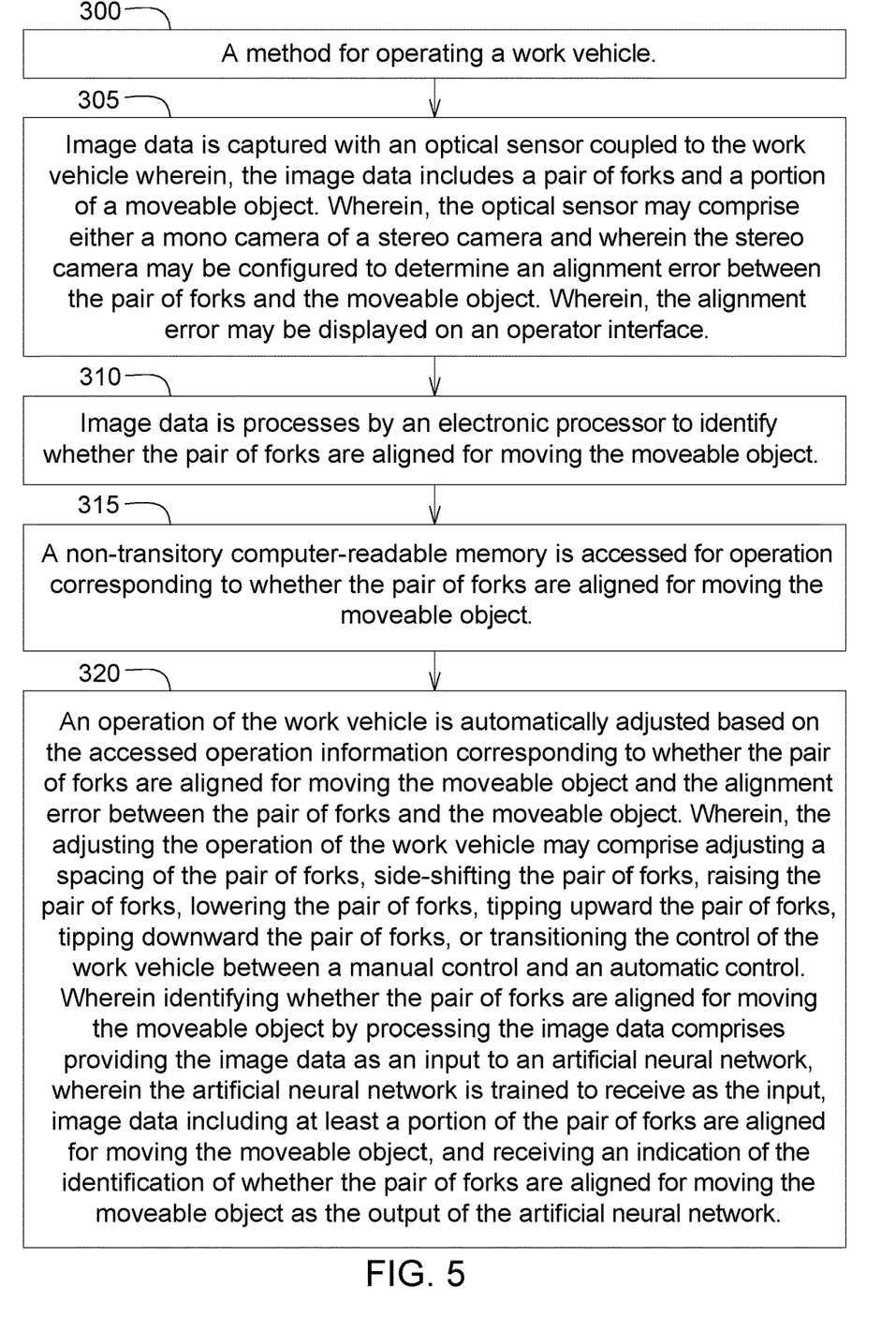
FIG. 5 is a flow diagram of a method for operating the work vehicle.

Referring now to FIG. 5, a flow diagram of a method 300 for operating a work vehicle is shown. At 305, image data 160 is captured with an optical sensor 155 coupled to the work vehicle 10 wherein the image data 160 includes a pair of forks 100 and a portion of a moveable object 25. Wherein, the optical sensor 155 may comprise either a mono camera 165 or a stereo camera 170 and wherein the stereo camera 170 may be configured to determine an alignment error between the pair of forks 100 and the moveable object 25. Wherein, the alignment error may be displayed on an operator interface 180.

At 310, image data 160 is processed by an electronic processor 190 to identify whether the pair of forks 100 are aligned for moving the moveable object 25. At 315, a non-transitory computer-readable memory 195 is accessed for operation information 200 corresponding to whether the pair of forks 100 are aligned for moving the moveable object 25.

At 320, an operation of the work vehicle 10 is automatically adjusted based on the accessed operation information 200 corresponding to whether the pair of forks 100 are aligned for moving the moveable object 25 and the alignment error between the pair of forks 100 and the moveable object 25. Wherein, the adjusting the operation of the work vehicle 10 may comprise adjusting a spacing of the pair of forks 100, side-shifting the pair of forks 100, raising the pair of forks 100, lowering the pair of forks 100, tipping upward the pair of forks 100, tipping downward the pair of forks 100, or transitioning the control of the work vehicle 10 between a manual control 220 and an automatic control 225. Wherein identifying whether the pair of forks 100 are aligned for moving the moveable object 25 by processing the image data 160 comprises providing the image data 160 as an input to an artificial neural network 215, wherein the artificial neural network 215 is trained to receive as the input, image data 160 including at least a portion of the pair of forks 100 and at least a portion of the moveable object 25, and to produce as an output, an identification of whether the pair of forks 100 are aligned for moving the moveable object 25, and receiving an indication of the identification of whether the pair of forks 100 are aligned for moving the moveable object 25 as the output of the artificial neural network 215.

Without in any way limiting the scope, interpretation, or application of the claims appearing below, a technical effect of one or more of the example embodiments disclosed herein is a faster and more efficient method of controlling the actuators of a linkage to level a ground engaging tool connected to the linkage without changing the height at a tip of the ground engaging tool. While the height of the tip of the ground engaging tool may be the same before and after the leveling operation, the height may change during the leveling process in certain embodiments, and the forward and backward position of the tip may also change throughout the leveling process and even at the end of the leveling process, depending on the nature of the linkage involved.

What is claimed is:

1. A method of operating a work vehicle, the method comprising:
    capturing image data with an optical sensor coupled to the work vehicle wherein, the image data includes a pair of forks and a moveable object;
    identifying whether the pair of forks are aligned for moving the moveable object and determining an alignment error between the pair of forks and the moveable object by processing the image data with an electronic processor;
    accessing, from a non-transitory computer-readable memory, operation information corresponding to whether the pair of forks are aligned for moving the moveable object; and adjusting an operation of the work vehicle based on the accessed operation information corresponding to whether the pair of forks are aligned for moving the moveable object and based on the alignment error between the pair of forks and the moveable object;

wherein the adjusting the operation of the work vehicle comprises transitioning the control of the work vehicle between a manual control and an automatic control.

2. The method of claim 1, wherein the adjusting the operation of the work vehicle comprises adjusting a spacing of the pair of forks, side-shifting the pair of forks, raising the pair of forks upward, lowering the pair of forks downward, tipping upward the pair of forks, or tipping downward the pair of forks.

3. The method of claim 1, wherein the optical sensor comprises a stereo camera.

4. The method of claim 1, wherein the alignment error is displayed on an operator interface.

5. The method of claim 1, wherein the optical sensor comprises a mono camera.

6. The method of claim 1, wherein identifying whether the pair of forks are aligned for moving the moveable object by processing the image data comprises:

providing the image data as an input to an artificial neural network, wherein the artificial neural network is trained to receive as the input, image data including at least a portion of the pair of forks and at least a portion of the moveable object, and to produce as an output, an identification of whether the pair of forks are aligned for moving the moveable object; and receiving an indication of the identification of whether the pair of forks are aligned for moving the moveable object as the output of the artificial neural network.

7. A control system for a work vehicle, the control system comprising:

an optical sensor coupled to the work vehicle, the optical sensor configured to capture image data that includes a pair of forks and a moveable object;

a non-transitory computer-readable memory storing operation information; and an electronic processor configured to:

perform an operation by controllably adjusting a position of the pair of forks, receive image data captured by the optical sensor, apply an artificial neural network to identify whether the pair of forks are aligned for moving the moveable object based on the image data from the optical sensor, wherein the artificial neural network is trained to receive the image data as input and to produce as the output an indication of whether the pair of forks are aligned for moving the moveable object, access, from the non-transitory computer-readable memory, the operation information corresponding to whether the pair of forks are aligned for moving the moveable object, and adjust an operation of the work vehicle based on the accessed operation information corresponding to whether the pair of forks are aligned for moving the moveable object, wherein the step of adjusting the operation of the work vehicle comprises a transition of the control of the work vehicle between a manual control and an automatic control.

8. The control system of claim 7, wherein adjusting the operation of the work vehicle further comprises changing a spacing of the pair of forks, side-shifting the pair of forks, raising the pair of forks upward, lowering the pair of forks downward, tipping upward the pair of forks, or tipping downward the pair of forks.

9. The control system of claim 7, wherein the optical sensor comprises a stereo camera.

10. The control system of claim 9, wherein the stereo camera is configured to determine an alignment error between the pair of forks and the moveable object.

11. The control system of claim 10, wherein the alignment error is displayed on an operator interface.

12. The control system of claim 10, wherein adjusting the operation of the work vehicle is based on the operation information corresponding to whether the pair of forks are aligned for moving the moveable object and the alignment error between the pair of forks and the moveable object.

13. The control system of claim 7, wherein the optical sensor comprises a mono camera.

14. The control system of claim 7, wherein identifying whether the pair of forks are aligned for moving the moveable object by processing the image data comprises:

providing the image data as an input to an artificial neural network, wherein the artificial neural network is trained to receive as the input, image data including at least a portion of the pair of forks and at least a portion of the moveable object, and to produce as an output, an identification of whether the pair of forks are aligned for moving the moveable object; and receiving an indication of the identification of whether the pair of forks are aligned for moving the moveable object as the output of the artificial neural network.

15. A work vehicle comprising:

a pair of forks;

an optical sensor coupled to the work vehicle, the optical sensor configured to capture image data that includes the pair of forks and a moveable object;

a non-transitory computer-readable memory storing operation information; and an electronic processor configured to:

perform an operation by controllably adjusting a position of the pair of forks, receive image data captured by the optical sensor, apply an artificial neural network to identify whether the pair of forks are aligned for moving the moveable object, wherein the artificial neural network is trained to receive the image data as input and to produce as the output an indication of whether the pair of forks are aligned for moving the moveable object, access, from the non-transitory computer-readable memory, the operation information corresponding to whether the pair of forks are aligned for moving the moveable object, and adjust an operation of the work vehicle based on the accessed operation information corresponding to whether the pair of forks are aligned for moving the moveable object;

wherein the step of adjusting the operation of the work vehicle comprises a transition of the control of the work vehicle between a manual control and an automatic control.

16. The work vehicle of claim 15, wherein the optical sensor comprises at least one of a mono camera or a stereo camera.

* * * * *